(12) United States Patent
Zheng et al.

(10) Patent No.: US 11,098,196 B2
(45) Date of Patent: Aug. 24, 2021

(54) SILICONE COMPOSITION COMPRISING FILLER

(71) Applicant: Dow Silicones Corporation, Midland, MI (US)

(72) Inventors: Yan Zheng, Shanghai (CN); Zhongwei Cao, Shanghai (CN); Don Kleyer, Midland, MI (US); Tassie Andersen, Salem, MA (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/629,978

(22) PCT Filed: Sep. 29, 2017

(86) PCT No.: PCT/CN2017/104363
§ 371 (c)(1),
(2) Date: Jan. 10, 2020

(87) PCT Pub. No.: WO2019/061290
PCT Pub. Date: Apr. 4, 2019

(65) Prior Publication Data
US 2020/0224031 A1    Jul. 16, 2020

(51) Int. Cl.
*C08L 83/04* (2006.01)
*C08K 3/013* (2018.01)

(52) U.S. Cl.
CPC .............. *C08L 83/04* (2013.01); *C08K 3/013* (2018.01); *C08K 2201/001* (2013.01)

(58) Field of Classification Search
CPC .. C08G 77/18; C08G 77/44; C08K 2201/001; C08K 3/013; C09D 183/14
See application file for complete search history.

(56) References Cited

U.S. PATENT DOCUMENTS

| | | | |
|---|---|---|---|
| 6,306,951 B1 | 10/2001 | Montag et al. | |
| 6,844,393 B2 | 1/2005 | Goto et al. | |
| 7,291,671 B2 | 11/2007 | Fukui | |
| 7,329,706 B2 | 2/2008 | Fukui et al. | |
| 7,547,743 B2 | 6/2009 | Goto et al. | |
| 8,119,758 B2 | 2/2012 | Sakurai et al. | |
| 8,383,005 B2 | 2/2013 | Tsuji et al. | |
| 2005/0256259 A1 | 11/2005 | Goto et al. | |
| 2006/0135687 A1 | 6/2006 | Fukui | |
| 2007/0293624 A1 | 12/2007 | Matsumoto et al. | |
| 2017/0121462 A1 | 5/2017 | Fujisawa et al. | |
| 2018/0230172 A1 | 8/2018 | Furukawa et al. | |

FOREIGN PATENT DOCUMENTS

| JP | 2013124257 | | 6/2013 |
|---|---|---|---|
| WO | 2015022998 | * | 2/2015 |

OTHER PUBLICATIONS

Search report from corresponding European 17926983 application, dated Apr. 6, 2021.

* cited by examiner

*Primary Examiner* — Kuo Liang Peng

(57) ABSTRACT

A composition comprising: (A) an organopolysiloxane, (B) a filler and (C) a filler treatment agent, comprising a mixture of two organopolysiloxanes having the general formulas (I) and (II), $R^1R^2R^3Si-[(CH_2)_{n1}(Me_2SiO)_{m1}]_r-[O-(Me_2SiO)_{m3}]_p-(Me_2Si)_o(CH_2)_{n2}(Me_2SiO)_{m2}-(CH_2)_{n3}-Si(OR^4_3)_3$ (I), wherein 'Me' is methyl group, $R^1$, $R^2$ and $R^3$ are independently selected from an alkyl group having 1 to 20 carbon atoms, an alkenyl group having 2 to 4 carbon atoms, an alkoxy group having 1 to 3 carbon atoms or $-(OSiR^7R^8R^9)$, in which $R^7$, $R^8$ and $R^9$ are independently selected from an alkyl group having 1 to 4 carbon atoms, $R^4$ is an alkyl group having 1 to 4 carbon atoms, n1, n2, m1, m3 and o are integers from 1 to 200, m2, n3, r and p are integers from 0 to 200, r and p are not 0 at the same time, $(R^5O)_3Si-[(CH_2)_{n1}(Me_2SiO)_{m1}]_r-(CH_2)_{n4}-[O-(Me_2SiO)_{m3}]_p-(Me_2Si)o-(CH_2)_{n2}-(Me_{O2}SiO)_{m2}-(CH_2)_{n3}-Si(OR^6)_3$ (II), wherein $R^5$ and $R^6$ are an alkyl group having 1 to 4 carbon atoms, n1, m1, m3, o and n2 are integers from 1 to 200, n3, n4, m2, r and p are integers from 0 to 200, r and p are not 0 at the same time.

9 Claims, 1 Drawing Sheet

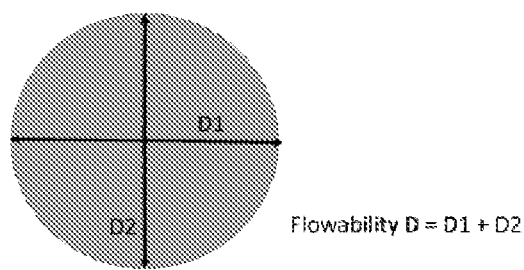

SILICONE COMPOSITION COMPRISING FILLER

FIELD

The present invention relates generally to a silicone composition comprising filler. The silicone composition can comprise a large amount of filler without decreasing good handling and molding properties of the composition, so the composition is suitable for a thermally conductive silicone composition which needs to comprise a large amount of thermally conductive filler.

INTRODUCTION

Cured silicone (organopolysiloxane) material often comprises filler to improve its properties, such as mechanical strength, electrical conductivity or thermal conductivity. In particular, thermal conductivity is required in some technical areas, because organopolysiloxane itself is not thermally conductive.

Thermal management is critical in every aspect of electronics devices, such as integrated circuits (ICs), light-emitting diodes (LEDs), central processing units (CPUs) and printed-circuit substrates. The performance of these devices can be directly affected by the operating temperature. Lowering the operating temperature of these devices often increases lifetime and improves performance, as compared to operations at a higher temperature.

Normally, heat generated by electronic devices is removed and dissipated using thermally conductive materials. Thermally conductive silicone compositions have been developed as a high-efficiency thermal transfer material between two surfaces. The compositions typically comprise a dispersion of thermally conductive fillers in a silicone matrix resin, and provide thermally conductive materials in the form of rubber, gel, grease or pottant. In order to improve the thermal conductivity of silicone materials, a large amount of the thermally conductive filler has to be added in the matrix resin.

However, the higher thermally conductive filler contents causes increased viscosity of the composition, thus handling and molding properties of the composition deteriorate substantially. To improve the dispersion of fillers in a silicone matrix resin with good handling and molding properties, filler treatment agents have been used and added in silicone compositions, described in, for example, U.S. Pat. Nos. 6,306,951B, 8,383,005B, 6,844,393B, 8,119,758B, JP04495749B, U.S. Pat. No. 7,547,743B, JP2013124257A, U.S. Pat. Nos. 7,329,706B and 7,291,671B.

SUMMARY

The present invention provides a silicone composition which possesses good handling property despite containing a large amount of filler.

One aspect of the invention relates to a composition comprising (A) an organopolysiloxane, (B) a filler and (C) a filler treatment agent, wherein the filler treatment agent comprises a mixture of two organopolysiloxanes having the general formulas (I) and (II), Formula (I):

$R^1R^2R^3Si-[(CH_2)_{n1}(Me_2SiO)_{m1}]_r-[O-(Me_2SiO)_{m3}]_p-(Me_2Si)_o(CH_2)_{n2}(Me_2SiO)_{m2}-(CH_2)_{n3}-Si(OR^4)_3$ (I)

wherein 'Me' is methyl group, $R^1$, $R^2$ and $R^3$ are independently selected from an alkyl group having 1 to 20 carbon atoms, an alkenyl group having 2 to 4 carbon atoms, an alkoxy group having 1 to 3 carbon atoms or $-(OSiR^7R^8R^9)$, in which $R^7$, $R^8$ and $R^9$ are independently selected from an alkyl group having 1 to 4 carbon atoms, $R^4$ is an alkyl group having 1 to 4 carbon atoms, n1, n2, m1, m3 and o are integers from 1 to 200, m2, n3, r and p are integers from 0 to 200, r and p are not 0 at the same time, Formula (II):

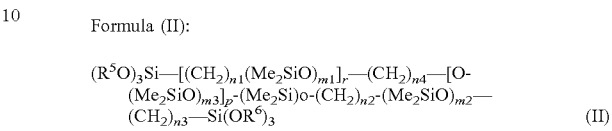

wherein $R^5$ and $R^6$ are an alkyl group having 1 to 4 carbon atoms, n1, m1, m3, o and n2 are integers from 1 to 200, n3, n4, m2, r and p are integers from 0 to 200, r and p are not 0 at the same time.

In another aspect, the invention relates to a cured silicone material comprising a filler, in which the cured silicone material is formed from the composition mentioned above.

In yet another aspect, the invention relates to a filler treatment agent used for a silicone material, in which the filler treatment agent comprises a mixture of two organopolysiloxanes having the general formulas (I) and (II) mentioned above, and the moler ratio of the organopolysiloxane represented by formula (I) over the organopolysiloxane represented by formula (II) ((I)/(II)) is from 2 to 15.

BRIEF DESCRIPTION OF THE DRAWINGS

FIG. 1 is a top view showing dispersed sample when measuring horizontal flowability of the sample.

DETAILED DESCRIPTION

The composition of the invention comprises (A) an organopolysiloxane, (B) a filler and (C) a filler treatment agent comprising a mixture of two specific organopolysiloxanes.

(A) Organopolysiloxane

The organopolysiloxane used in the composition is a matrix polymer, or becomes a matrix polymer after the composition is cured. One example of the organopolysiloxane is a crosslinkable organopolysiloxane which can be cured. The molecular structure of the organopolysiloxane can be a straight-chain, branched-chain, partially branched straight-chain or dendritic structure. Preferably, the molecular structure of the organopolysiloxane is a straight-chain or a partially branched straight-chain structure. The viscosity of the organopolysiloxane is preferably from 20 to 100,000 mPa·s, more preferably from 50 to 100,000 mPa·s, and even more preferably from 100 to 50,000 mPa·s. When the composition is cured by hydrosilylation reaction, the organopolysiloxane has at least 0.05 weight % of silicone-bonded alkenyl groups, preferably at least 0.2 weight % of silicone-bonded alkenyl groups, and more preferably at least 0.8 weight % of silicone-bonded alkenyl groups. Examples of such alkenyl group include, but are not limited to, vinyl, allyl, butenyl, penteny and hexenyl. When the composition is cured by condensation reaction, the organopolysiloxane has at least two hydroxyl groups or hydrolysable groups per molecule, where those groups are connected to silicone atoms. The amount of hydroxyl groups or hydrolysable groups connected to silicone atoms is preferably at least 0.05 weight %, more preferably at least 0.5 weight %, and even more preferably at least 0.8 weight %. The hydrolysable groups react with moisture in the atmosphere and becomes hydroxyl groups. Hydroxyl groups in the organopolysiloxane can get cross-linked further with a crosslinker. Examples of the hydrolysable groups include, but are not limited to, alkoxy groups such as methoxy, ethoxy and propoxy; alkenoxy groups such as vinyloxy, propenoxy, isopropenoxy and 1-ethyl-2-methylvinyloxy; alkoxyalkoxy such as methoxyethoxy, ethoxyethoxy and methoxypropoxy; acyloxy groups such as acetoxy and octanoyloxy; ketoxime groups such as dimethylketoxime and methlethylkotoxime; amino groups such as dimethylamino, diethylamino and butylamino; aminoxy groups such as dimethylaminoxy and diethylaminoxy and amide groups such as N-methylacetamide and N-ethylacetamide.

Examples of the organopolysiloxane include, but are not limited to, dimethylvinylsiloxy-terminated dimethylpolysiloxanes; methylphenylvinylsiloxy-terminated dimethylpolysiloxanes; dimethylvinylsiloxy-terminated dimethylsiloxane-methylphenylsiloxane copolymers; dimethylvinylsiloxy-terminated dimethylsiloxane-methylvinylsiloxane copolymers; trimethylsiloxy-terminated dimethylsiloxane-methylvinylsiloxane copolymers; dimethylvinylsiloxy-terminated methyl(3,3,3-trifluoropropyl) polysiloxanes; silanol-terminated dimethylsiloxane-methylvinylsiloxane copolymers; silanol-terminated dimethlsiloxane-methylvinylsiloxane-methylphenylsiloxane copolymers; organosiloxane copolymers consisting of $(CH_3)_3SiO_{1/2}$ siloxane unit, $(CH_3)_2(CH_2=CH)SiO_{1/2}$ siloxane unit, $CH_3SiO_{3/2}$ siloxane unit and $(CH_3)_2SiO_{2/2}$ siloxane unit; silanol-terminated dimethylpolysiloxanes; silanol-terminated dinetylsiloxane-methylphenylsiloxanes copolymers; trimethoxysiloxy-terminated dimethylpolysiloxanes; trimethoxysiloxy-terminated dimethylsiloxane-methylphenylsiloxane copolymers; methyldimethoxysiloxy-terminated dimethylpolysiloxanes and mixtures of two or more thereof.

The amount of organopolysiloxane is preferably from 1 to 40 weight %, more preferably from 5 to 30 weight %, and even more preferably from 5 to 20 weight % based on the weight of the composition.

(B) Filler

The filler used in the composition is normally particles which improves the properties of cured silicone materials. Examples of such filler include, but are not limited to, reinforcing filler, electrically conductive filler and thermally conductive filler. In this invention, thermally conductive filler is preferable. The thermally conductive filler has thermal conductivity of preferably 20 W/mK or higher, more preferably 50 W/mK or higher, and even more preferably 100 W/mK or higher. Examples of such thermally conductive filler include, but are not limited to, boron nitride (BN), aluminum nitride (AlN), magnesium oxide (MgO), silicon nitride ($Si_3N_4$), alumina ($Al_2O_3$), graphite, carbon nanotube, carbon fiber, carbon black and metal particles such as silver, copper, aluminum, nickel and iron.

The average particle size of the filler is preferably from 0.1 to 200 micrometers, more preferably from 0.1 to 100 micrometers, and even more preferably from 0.1 to 50 micrometers.

The amount of filler in the composition is from 50 to 95 weight %, and preferably from 80 to 95 weight % based on the weight of the composition.

(C) Filler Treatment Agent Comprising a Mixture of Two Specific Organopolysiloxanes The term 'filler treatment agent' in this disclosure means an agent which can bind to the surface of a filler chemically or physically, which as a result can increase the amount of filler in a silicone composition. Without wishing to be bound by a theory, it is considered that the filler treatment agent used in the invention can increase the compatibility between the treated filler and the matrix polymer, thus a composition can comprise a large amount of filler. In some cases, the filler treatment agent can react with functional groups (such as hydroxyl group) on the surface of filler.

The filler treatment agent used in the composition is a mixture of two specific organopolysiloxanes. The two organopolysiloxanes are represented by the following formulas (I) and (II).

Formula (I)

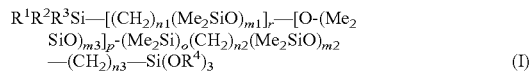

$R^1R^2R^3Si—[(CH_2)_{n1}(Me_2SiO)_{m1}]_r—[O-(Me_2SiO)_{m3}]_p-(Me_2Si)_o(CH_2)_{n2}(Me_2SiO)_{m2}—(CH_2)_{n3}—Si(OR^4)_3$     (I)

In the formula (I), 'Me' is a methyl group. $R^1$, $R^2$ and $R^3$ are independently selected from an alkyl group having 1 to 20 carbon atoms, an alkenyl group having 2 to 4 carbon atoms, an alkoxy group having 1 to 3 carbon atoms or $(OSiR^7R^8R^9)$, in which $R^7$, $R^8$ and $R^9$ are independently selected from an alkyl group having 1 to 4 carbon atoms. $R^4$ is an alkyl group having 1 to 4 carbon atoms. n1, n2, m1, m3 and o are integers from 1 to 200, m2, n3, r and p are integers from 0 to 200, r and p are not 0 at the same time. Preferably, m1 and m3 are integers from 5 to 200.

Without wishing to be bound by a theory, it is considered that the formula (I) compound can easily bind to the surface of a filler either through chemical bonding or physical bonding and give better affinity to the filler with organopolysiloxane (matrix polymer), thus rendering the silicone composition flowable and with good processability even when a large amount of filler is loaded.

Examples of the compound represented by Formula (I) include, but are not limited to,

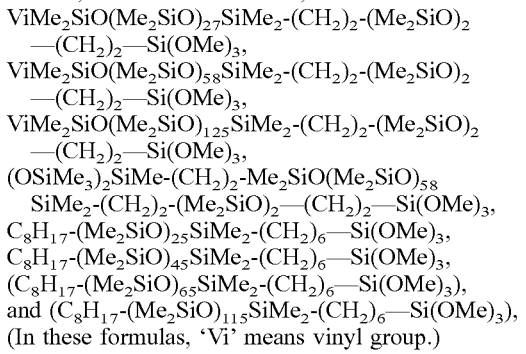

$ViMe_2SiO(Me_2SiO)_{27}SiMe_2-(CH_2)_2-(Me_2SiO)_2—(CH_2)_2—Si(OMe)_3$, $ViMe_2SiO(Me_2SiO)_{58}SiMe_2-(CH_2)_2-(Me_2SiO)_2—(CH_2)_2—Si(OMe)_3$, $ViMe_2SiO(Me_2SiO)_{125}SiMe_2-(CH_2)_2-(Me_2SiO)_2—(CH_2)_2—Si(OMe)_3$, $(OSiMe_3)_2SiMe-(CH_2)_2-Me_2SiO(Me_2SiO)_{58}SiMe_2-(CH_2)_2-(Me_2SiO)_2—(CH_2)_2—Si(OMe)_3$, $C_8H_{17}-(Me_2SiO)_{25}SiMe_2-(CH_2)_6—Si(OMe)_3$, $C_8H_{17}-(Me_2SiO)_{45}SiMe_2-(CH_2)_6—Si(OMe)_3$, $(C_8H_{17}-(Me_2SiO)_{65}SiMe_2-(CH_2)_6—Si(OMe)_3)$, and $(C_8H_{17}-(Me_2SiO)_{115}SiMe_2-(CH_2)_6—Si(OMe)_3)$, (In these formulas, 'Vi' means vinyl group.)

Formula (II)

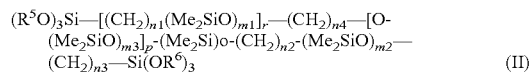

$(R^5O)_3Si—[(CH_2)_{n1}(Me_2SiO)_{m1}]_r—(CH_2)_{n4}—[O-(Me_2SiO)_{m3}]_p-(Me_2Si)o-(CH_2)_{n2}-(Me_2SiO)_{m2}—(CH_2)_{n3}—Si(OR^6)_3$     (II)

In the formula (II), $R^5$ and $R^6$ are an alkyl group having 1 to 4 carbon atoms, n1, m1, m3, o and n2 are integers from 1 to 200, n3, n4, m2, r and p are integers from 0 to 200, r and p are not 0 at the same time. Preferably, m1 and m3 are integers from 5 to 200.

Examples of the compound represented by Formula (II) include, but are not limited to,

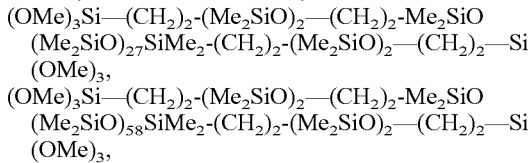

$(OMe)_3Si—(CH_2)_2-(Me_2SiO)_2—(CH_2)_2-Me_2SiO(Me_2SiO)_{27}SiMe_2-(CH_2)_2-(Me_2SiO)_2—(CH_2)_2—Si(OMe)_3$, $(OMe)_3Si—(CH_2)_2-(Me_2SiO)_2—(CH_2)_2-Me_2SiO(Me_2SiO)_{58}SiMe_2-(CH_2)_2-(Me_2SiO)_2—(CH_2)_2—Si(OMe)_3$, (OMe)$_3$Si—(CH$_2$)$_2$-(Me$_2$SiO)$_2$—(CH$_2$)$_2$-Me$_2$SiO(Me$_2$SiO)$_{125}$SiMe$_2$-(CH$_2$)$_2$-(Me$_2$SiO)$_2$—(CH$_2$)$_2$—Si(OMe)$_3$,
(OMe)$_3$Si—(CH$_2$)$_6$-(Me$_2$SiO)$_{25}$SiMe$_2$-(CH$_2$)$_6$—Si(OMe)$_3$,
(OMe)$_3$Si—(CH$_2$)$_6$-(Me$_2$SiO)$_{45}$SiMe$_2$-(CH$_2$)$_6$—Si(OMe)$_3$,
(OMe)$_3$Si—(CH$_2$)$_6$-(Me$_2$SiO)$_{65}$SiMe$_2$-(CH$_2$)$_6$—Si(OMe)$_3$
and
(OMe)$_3$Si—(CH$_2$)$_6$-(Me$_2$SiO)$_{115}$SiMe$_2$-(CH$_2$)$_6$—Si(OMe)$_3$.

The molar ratio of Formula (I) compound over Formula (II) compound ((I)/(II)) is 2 to 15, and preferably from 6 to 12.

The mixture of the two specific organopolysiloxanes possess good handling property despite the composition comprises a large amount of thermal conductive filler. Without wishing to be bound by a theory, it is considered that the two specific organopolysiloxanes work together as a filler treatment agent in the composition that increases the compatibility between the filler and the matrix polymer. Since the formulas (I) and (II) compounds have terminal alkoxy groups, they can react with hydroxyl groups on the surface of the filler. In addition, the mixture of the two different compounds can decrease viscosity of the compound comprising a large amount of fillers and help improving the stability of the viscosity than single use of one of the compounds.

The amount of the filler treatment agent in the composition is from 0.1 to 20 weight %, and preferably from 0.1 to 10 weight % based on the weight of the composition.

The filler treatment agent may be prepared by various reactions, the examples of which are the following three methods, shown as Schemes 1 to 3 below.

Scheme 1

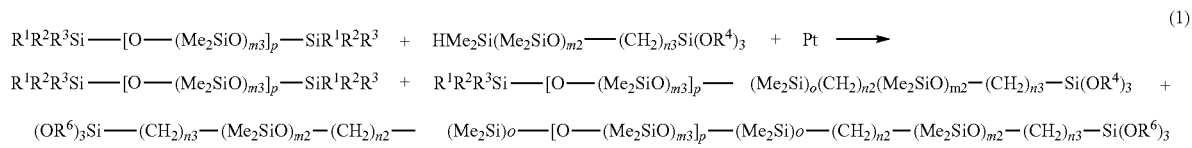

(1)

This reaction is hydrosilylation of bis-alkenyl group terminated organopolysiloxane with organosiloxane having SiH group. The catalyst of the hydrosilylation are known in the art, but are exemplified by chloroplatinic acid, olefin complexes of platinum, alkenylsiloxane complexes of platinum, platinum on alumina and platinum on carbon. Among the catalysts, platinum on alumina and platinum on carbon are preferable. The molar ratio of [R$^1$R$^2$R$^3$Si—[O-(Me$_2$SiO)$_{m3}$]$_p$—SiR$^1$R$^2$R$^3$] over [HMe$_2$Si(Me$_2$SiO)$_{m2}$—(CH$_2$)$_{n3}$Si(OR$^4$)$_3$] is from 2 to 10, and preferably from 2 to 6. The weight ratio of the catalyst over [R$^1$R$^2$R$^3$Si—[O-(Me$_2$SiO)$_{m3}$]$_p$—SiR$^1$R$^2$R$^3$] is, from 0.01 to 1000 ppm, and preferably from 0.1 to 500 ppm as the metal from the catalyst. The reaction temperature is basically from 40 to 120 degrees C., and the reaction time is 30 to 240 minutes. After cooling to room temperature, the obtained mixture can be separated from the catalyst by filtration, and un-reacted raw materials and by-product can be removed under vacuum.

Scheme 2

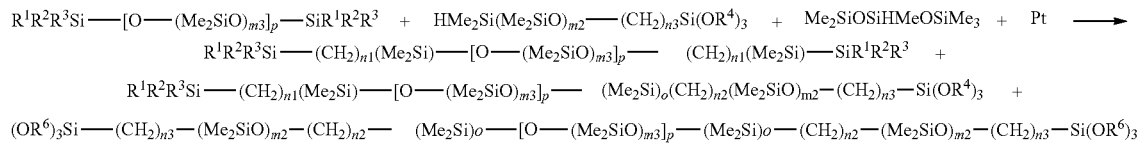

This reaction is hydrosilylation of bis-alkenyl group terminated organopolysiloxane with organosiloxane having SiH group. The catalyst of the hydrosilylation are known in the art, but are exemplified by chloroplatinic acid, olefin complexes of platinum, alkenylsiloxane complexes of platinum, platinum on alumina and platinum on carbon. Among the catalysts, platinum on alumina and platinum on carbon are preferable. The molar ratio of $Me_3SiOSiHMeOSiMe_3$ over $HMe_2Si(Me_2SiO)_{m2}$—$(CH_2)_{n3}Si(OR^4)_3$ is from 2 to 10, and preferably from 3 to 8. The weight ratio of the catalyst over $[R^1R^2R^3Si$—$[O-(Me_2SiO)_{m3}]_p$—$SiR^1R^2R^3]$ is 0.01 to 1000 ppm, and preferably from 0.1 to 500 ppm as the metal from the catalyst. The reaction temperature is basically from 40 to 120 degrees C., and the reaction time is 30 to 240 minutes. After cooling to room temperature, the obtained mixture can be separated from the catalyst by filtration, and un-reacted raw materials and by-product can be removed under vacuum.

homopolymer, or a copolymer, or a mixture of such polymers. Examples of the organopolysiloxane include, but are not limited to, dimethylhydrogensiloxy-terminated dimethylpolysiloxanes; trimethylsiloxy-terminated dimethylsiloxane-methylhydrogensiloxane copolymers; dimethylhydrogensiloxy-terminated dimethylsiloxane-methylhydrogensiloxane copolymers; organosiloxane copolymers consisting of $(CH_3)_2SiO_{1/2}$ siloxane unit, $(CH_3)_2HSiO_{1/2}$ siloxane unit and $SiO_{4/2}$ siloxane unit, and mixtures of two or more thereof. The amount of the organopolysiloxane is set so that there is preferably 0.2 to 2.0 moles of the SiH of the organopolysiloxane per 1 mole of SiVi groups of the matrix resin within component (A).

Suitable platinum catalysts are known in the art, and examples include, but are not limited to, chloroplatinic acid, olefin complexes of platinum, alkenylsiloxane complexes of platinum, platinum on alumina and platinum on carbon. The amount of the platinum catalyst is, preferably 0.1 to 500 ppm Scheme 3

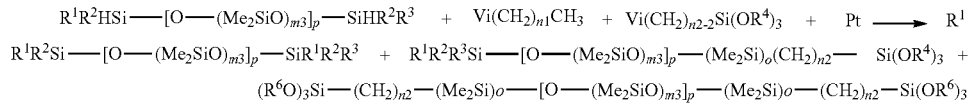

This reaction is hydrosilylation of bis-hydrogen group terminated organopolysiloxane with alkene and alkenyltrimethoxysilane. The catalyst of the hydrosilylation are known in the art, but are exemplified by chloroplatinic acid, olefin complexes of platinum, alkenylsiloxane complexes of platinum, platinum on alumina and platinum on carbon. Among the catalysts, platinum on alumina and platinum on carbon are preferable. The molar ratio of $Vi(CH_2)_{n1}CH_3$ over $Vi(CH_2)_{n2-2}Si(OR^4)_3$ is from 2 to 10, and preferably from 3 to 8. The weight ratio of the catalyst over $[R^1R^2HSi$—$[O-(Me_2SiO)_{m3}]_p$—$SiHR^2R^3]$ is, 0.01 to 1000 ppm, preferably from 0.1 to 500 ppm as the metal from the catalyst. The reaction temperature is basically from 40 to 120 degrees C., and the reaction time is 30 to 240 minutes. After cooling to room temperature, the obtained mixture can be separated from the catalyst by filtration, and un-reacted raw materials and by-product can be removed under vacuum.

(D) Other components

The composition of this invention can be cured by a curing agent.

When the composition is cured by hydrosilylation reaction, the curing agent comprises platinum catalyst and organopolysiloxane which contains an average of at least two silicon-bonded hydrogen atoms per molecule. The molecular structure of the organopolysiloxane can be a straight-chain, a partially branched straight-chain, a cyclic, and a dendritic structures. The organopolysiloxane can be a as platinum metal from the catalyst, relative to the combined weight of SiVi and SiH organopolysiloxane.

When the composition is cured by a condensation reaction, the curing agent comprises a silane or siloxane oligomers having at least three silicon-bonded hydrolysable groups in each molecule and optionally a condensation catalyst. Examples of such silanes and siloxane oligomers include, but are not limited to, tetraethoxysilane, methyltriethoxysilane, vinyltriethoxysilane, methyltris(methyl ethyl ketoxime) silane, vinyltriacetoxysilane and ethyl orthosilicate. The amount of the silane or siloxane oligomer is, preferably 70-99 parts by weight, relative to the sum of component (A) and curing agent.

Condensation catalysts are known in the art, and examples include, but are not limited to, dibutyltin diacetate, (tetraisopropoxytitanium, diisopropoxybis(ethyl acetoacetate)titanium, zinc naphthenate and 3-aminopropyltriethoxysilane. The amount of the condensation catalyst is, preferably 5 to 15 parts by weight, relative to 100 parts of component (A) and the curing agent.

The composition can optionally comprise other components; for example, reinforcing fillers such as fumed silica, precipitated silica and fumed titanium oxide; pigments; dyes; stabilizers; flame retardants; plasticizers; and adhesion promoters. In particular, when the composition can be cured by hydrosilylation reaction, the composition can further comprise an inhibitor to adjust the cure speed of the composition and improve its handling. Examples of such inhibitor include, but are not limited to, acetylenic compounds such as 2-methyl-3-butyn-2-ol, 2-phenyl-3-butyn-2-ol and 1-ethynyl-1-cyclohexanol; ene-yne compounds such as 3-methyl-3-penten-1-yne and 3,5-dimethyl-3-hexen-1-yne; hydrazine compounds; phosphine compounds and mercaptan compounds. The content of such inhibitor is vary and depend on the required cure speed, but one example is 0.0001 to 1.0 wt % relative to the total amount of composition.

When preparing the composition, a filler treatment agent (component C) can be preliminary mixed with the filler (component B) to pretreat the surface of the filler, then the surface treated filler can be mixed with organopolysiloxane (component A). Or, filler (component B) can be mixed with organopolysiloxane (component A), then the filler treatment agent (component C) can be added to the mixture of component A and component B. In other cases, organopolysiloxane (component A), filler (component B) and filler treatment agent (component C) can be just mixed at once.

The composition of the invention is typically formulated as either 1-part or 2-parts.

When the composition of the invention comprises a crosslinkable organopolysiloxane, the composition can be cured and form a cured silicone material comprising a filler. In another case, the composition can be used without curing step when a non-reactive polymer matrix is used. The material can be rubber, gel, grease, slurry, paste and pottant.

When the filler is a thermally conductive filler, the cured material is thermally conductive. The thermal conductivity of the cured material is preferably 1.0 W/m·K or more, more preferably 1.5 W/m·K or more, and even more preferably 2.0 W/m·K or more.

EXAMPLES

Synthesis of Surface Treatment Agent

C-1: 88.7 g of di-vinyl terminated polydimethylsiloxane (PDMS) (viscosity 30 mPa·s, vinyl content 2.4 wt %), 5.7 g of $HMe_2SiOMe_2SiC_2H_4Si(OMe)_3$ and 0.3 g of platinum on alumina (platinum content of the platinum on alumina catalyst is 1%, the concentration of platinum metal in the composition is 30 ppm) were added in 250 mL flask. Mixed the raw materials at 100° C. for 4 hrs. After cooling to 25° C., filtrated the mixture to remove the catalyst powder and stripped at 180° C./<1 Torr.

C-2: 105.4 g of di-vinyl terminated PDMS (viscosity 70 mPa·s, vinyl content 1.2 wt %), 3.5 g of $HMe_2SiOMe_2SiC_2H_4Si(OMe)_3$ and 0.2 g of platinum on alumina (20 ppm as platinum metal) were added in 250 mL flask. Mixed the raw materials at 100° C. for 4 hrs. After cooling to 25° C., filtrated the mixture to remove the catalyst powder and stripped at 180° C./<1 Torr.

C-3: 154.5 g of di-vinyl terminated PDMS (viscosity 200 mPa·s, vinyl content 0.6 wt %), 2.1 g of $HMe_2SiOMe_2SiC_2H_4Si(OMe)_3$ and 0.3 g of platinum on alumina (20 ppm as platinum metal) were added in 250 mL flask. Mixed the raw materials at 100° C. for 4 hrs. After cooling to 25° C., filtrated the mixture to remove the catalyst powder and stripped at 180° C./<1 Torr.

C-4: 135 g of di-vinyl terminated PDMS (viscosity 70 mPa·s, vinyl content 1.2 wt %), 4.6 g of $HMe_2SiOMe_2SiC_2H_4Si(OMe)_3$, 10.7 g of $(Me_3SiO)_2SiHMe_2$ and 0.3 g of platinum on alumina (20 ppm as platinum metal) were added in 250 mL flask. Mixed the raw materials at 65° C. for 4 hrs. After cooling to 25° C., filtrated the mixture to remove the catalyst powder and stripped at 180° C./<1 Torr.

C-5: 135 g of di-hydrogen terminated PDMS (viscosity 30 mPa·s, hydrogen content 0.11 wt %), 6.4 g of hexenyltrimethoxysilane, 10.5 g of 1-octene and 0.3 g of platinum on alumina (20 ppm as platinum metal) were added in 250 mL flask. Mixed the raw materials at 65° C. for 4 hrs. After cooling to 25° C., filtrated the mixture to remove the catalyst powder and stripped at 180° C./<1 Torr.

C-6: 146.9 g of di-hydrogen terminated PDMS (viscosity 60 mPa·s, hydrogen content 0.06 wt %), 4.5 g of hexenyltrimethoxysilane, 7.4 g of 1-octene and 0.3 g of platinum on alumina (20 ppm as platinum metal) were added in 250 mL flask. Mixed the raw materials at 65° C. for 4 hrs. After cooling to 25° C., filtrated the mixture to remove the catalyst powder and stripped at 180° C./<1 Torr.

C-7: 214.3 g of di-hydrogen terminated PDMS (viscosity 90 mPa·s, hydrogen content 0.04 wt %), 4.6 g of hexenyltrimethoxysilane, 7.6 g of 1-octene and 0.45 g of platinum on alumina (20 ppm as platinum metal) were added in 250 mL flask. Mixed the raw materials at 65° C. for 4 hrs. After cooling to 25° C., filtrated the mixture to remove the catalyst powder and stripped at 180° C./<1 Torr.

C-8: 107.6 g of di-hydrogen terminated PDMS (viscosity 200 mPa·s, hydrogen content 0.013 wt %), 1.2 g of hexenyltrimethoxysilane, 2.1 g of 1-octene and 0.3 g of platinum on alumina (30 ppm as platinum metal) were added in 250 mL flask. Mixed the raw materials at 65° C. for 4 hrs. After cooling to 25° C., filtrated the mixture to remove the catalyst powder and stripped at 180° C./<1 Torr.

C-11: 84.3 g of di-vinyl terminated PDMS (viscosity 70 mPa·s, vinyl content 1.2 wt %), 5.6 g of $HMe_2SiOMe_2SiC_2H_4Si(OMe)_3$ and 0.2 g of platinum on alumina (20 ppm as platinum metal) were added in 250 mL flask. Mixed the raw materials at 100° C. for 4 hrs. After cooling to 25° C., filtrated the mixture to remove the catalyst powder and stripped at 180° C./<1 Torr.

C-12: 120.6 g of di-vinyl terminated PDMS (viscosity 70 mPa·s, vinyl content 1.2 wt %), 5.6 g of $HMe_2SiOMe_2SiC_2H_4Si(OMe)_3$ and 0.2 g of platinum on alumina (20 ppm as platinum metal) were added in 250 mL flask. Mixed the raw materials at 100° C. for 4 hrs. After cooling to 25° C., filtrated the mixture to remove the catalyst powder and stripped at 180° C./<1 Torr.

C-13: 105.4 g of di-vinyl terminated PDMS (viscosity 70 mPa·s, vinyl content 1.2 wt %), 2.8 g of $HMe_2SiOMe_2SiC_2H_4Si(OMe)_3$ and 0.2 g of platinum on alumina (20 ppm as platinum metal) were added in 250 mL flask. Mixed the raw materials at 100° C. for 4 hrs. After cooling to 25° C., filtrated the mixture to remove the catalyst powder and stripped at 180° C./<1 Torr.

Examples 1 to 15 and Comparative examples 1 to 4 were prepared by mixing the components described below in the ratios (wt %) shown in the Tables 1-4.

For Tables 1, 2 and 4: (A), (B), (C) were mixed by speed mixer, D-2, D-3, D-4 and D-5 were added and mixed, D-1 was finally added and mixed.

For Table 3: (A), (B), (C) were mixed at RT for 10 min, heated to 120° C. and mixed for 60 min. After cooling to under 40° C., D-2, D-3, D-4 and D-5 were added and mixed uniformly, D-1 was finally added and mixed uniformly.

<Measurements>

The following methods and instruments were used to analyze the properties of the components.

[Viscosity] Brookfield HADV II viscometer with spindle 21 #1 RPM at 25° C.

[Thermal conductivity] Hot disk, cured samples (80° C., 30 min), 9 mm thick

[Hardness] Shore A, cured samples (80° C., 30 min), 9 mm thick

[Tensile strength and elongation] Ref. ASTM D 412, SHEET THICKNESS 2 mm, cure at 80° C. for 30 minutes

[Lap shear to aluminum] Ref. ASTM D-816, two Q-panels (Alclad 2024T3) was bonded with a 2 mm thick composition (adhesion area: 25 mm×25 mm), and then cured at 80° C.*30 minutes. Place one laminate in a tensile tester to pull apart by shear and record the strength.

[Horizontal flowability] 1 mL sample was dispensed on glass, after spreading to form a circle at RT for 4 hours, record the cross diameters (mm) of the sphere as shown in FIG. 1. Horizontal flowability is the sum of D1 and D2 in the FIG. 1.

<Components A to D>

A-1: Di-vinyl terminated PDMS, with a viscosity of 70 mPa·s at 25° C., vinyl content 1.2 wt %

A-2: Di-vinyl terminated PDMS, with a viscosity of 200 mPa·s at 25° C., vinyl content 0.6 wt %

B-1: irregular alumina powder with an average particle size of 4 micrometers

B-2: spherical alumina powder with an average particle size of 40 micrometers

C-1: Mixture of $ViMe_2SiO(Me_2SiO)_{27}SiMe_2Vi$, $ViMe_2SiO(Me_2SiO)_{27}SiMe_2\text{-}(CH_2)_2\text{-}(Me_2SiO)_2\text{—}(CH_2)_2\text{—}Si(OMe)_3$) and $(OMe)_3Si\text{—}(CH_2)_2\text{-}(Me_2SiO)_2\text{—}(CH_2)_2\text{-}Me_2SiO(Me_2SiO)_{27}SiMe_2\text{-}(CH_2)_2\text{-}(Me_2SiO)_2\text{—}(CH_2)_2\text{—}Si(OMe)_3$ (Mole ratio is; 56:38:6)

C-2: Mixture of $ViMe_2SiO(Me_2SiO)_{58}SiMe_2Vi$, $ViMe_2SiO(Me_2SiO)_{58}SiMe_2\text{-}(CH_2)_2\text{-}(Me_2SiO)_2\text{—}(CH_2)_2\text{—}Si(OMe)_3$ and $(OMe)_3Si\text{—}(CH_2)_2\text{-}(Me_2SiO)_2\text{—}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ (Mole ratio is; 56:38:6)

C-3: Mixture of $ViMe_2SiO(Me_2SiO)_{125}SiMe_2Vi$, $ViMe_2SiO(Me_2SiO)_{125}SiMe_2\text{-}(CH_2)_2\text{-}(Me_2SiO)_2\text{—}(CH_2)_2\text{—}Si(OMe)_3$) and $(OMe)_3Si\text{—}(CH_2)_2\text{-}(Me_2SiO)_2\text{—}(CH_2)_2\text{-}Me_2SiO(Me_2SiO)_{125}SiMe_2\text{-}(CH_2)_2\text{-}(Me_2SiO)_2\text{—}(CH_2)_2\text{—}Si(OMe)_3$ (Mole ratio is; 56:38:6)

C-4: Mixture of $(OSiMe_3)_2SiMe\text{-}(CH_2)_2\text{-}Me_2SiO(Me_2SiO)_{58}SiMe_2\text{-}(CH_2)_2\text{—}SiMe(OSiMe_3)_2$, $(OSiMe_3)_2SiMe\text{-}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ and $(OMe)_3Si\text{—}(CH_2)_2\text{-}(Me_2SiO)_2\text{—}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ (Mole ratio is; 56:38:6)

C-5: Mixture of $C_8H_{17}\text{-}(Me_2SiO)_{25}SiMe_2\text{-}C_8H_{17}$, $C_8H_{17}\text{-}(Me_2SiO)_{25}SiMe_2\text{-}(CH_2)_6\text{—}Si(OMe)_3$), and $(OMe)_3Si\text{—}(CH_2)_6\text{-}(Me_2SiO)_{25}SiMe_2\text{-}(CH_2)_6\text{—}Si(OMe)_3$ (Mole ratio is; 56:38:6)

C-6: Mixture of $C_8H_{17}\text{-}(Me_2SiO)_{45}SiMe_2\text{-}C_8H_{17}$, $C_8H_{17}\text{-}(Me_2SiO)_{45}SiMe_2\text{-}(CH_2)_6\text{—}Si(OMe)_3$), and $(OMe)_3Si\text{—}(CH_2)_6\text{-}(Me_2SiO)_{45}SiMe_2\text{-}(CH_2)_6\text{—}Si(OMe)_3$ (Mole ratio is; 56:38:6)

C-7: Mixture of $C_8H_{17}\text{-}(Me_2SiO)_{65}SiMe_2\text{-}C_8H_{17}$, $C_8H_{17}\text{-}(Me_2SiO)_{45}SiMe_2\text{-}(CH_2)_6\text{—}Si(OMe)_3$), and $(OMe)_3Si\text{—}(CH_2)_6\text{-}(Me_2SiO)_{65}SiMe_2\text{-}(CH_2)_6\text{—}Si(OMe)_3$ (Mole ratio is; 56:38:6)

C-8: Mixture of $C_8H_{17}\text{-}(Me_2SiO)_{115}SiMe_2\text{-}C_8H_{17}$, $C_8H_{17}\text{-}(Me_2SiO)_{45}SiMe_2\text{-}(CH_2)_6\text{—}Si(OMe)_3$), and $(OMe)_3Si\text{—}(CH_2)_6\text{-}(Me_2SiO)_{115}SiMe_2\text{-}(CH_2)_6\text{—}Si(OMe)_3$ (Mole ratio is; 56:38:6)

C-9: $ViMe_2SiO(Me_2SiO)_{27}Si(OMe)_3$

C-10: $Me_3SiO(Me_2SiO)_{130}Si(OMe)_3$

C-11: Mixture of $ViMe_2SiO(Me_2SiO)_{58}SiMe_2Vi$, $ViMe_2SiO(Me_2SiO)_{58}SiMe_2\text{-}(CH_2)_2\text{-}(Me_2SiO)_2\text{—}(CH_2)_2\text{—}Si(OMe)_3$ and $(OMe)_3Si\text{—}(CH_2)_2\text{-}(Me_2SiO)_2\text{—}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ (Mole ratio is: 50:25:25)

C-12: Mixture of $ViMe_2SiO(Me_2SiO)_{58}SiMe_2Vi$, $ViMe_2SiO(Me_2SiO)_{58}SiMe_2\text{-}(CH_2)_2\text{-}(Me_2SiO)_2\text{—}(CH_2)_2\text{—}Si(OMe)_3$ and $(OMe)_3Si\text{—}(CH_2)_2\text{-}(Me_2SiO)_2\text{—}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ (Mole ratio is: 46:42:12)

C-13: Mixture of $ViMe_2SiO(Me_2SiO)_{58}SiMe_2Vi$, $ViMe_2SiO(Me_2SiO)_{58}SiMe_2\text{-}(CH_2)_2\text{-}(Me_2SiO)_2\text{—}(CH_2)_2\text{—}Si(OMe)_3$ and $(OMe)_3Si\text{—}(CH_2)_2\text{-}(Me_2SiO)_2\text{—}(CH_2)_2\text{-}Me_2SiO(Me_2SiO)_{58}SiMe_2\text{-}(CH_2)_2\text{-}(Me_2SiO)_2\text{—}(CH_2)_2\text{—}Si(OMe)_3$ (Mole ratio is; 32:64:4)

D-1: 1,3-Diethenyl-1,1,3,3-Tetramethyldisiloxane Complexes (Platinum) diluted in Dimethyl Siloxane, Dimethylvinylsiloxy-terminated D-2: Di-hydrogen terminated PDMS, with a viscosity of 10 mPa·s at 25° C., hydrogen content 0.14 wt %

D-3: Di-hydrogen terminated PDMS, with a viscosity of 10 mPa·s at 25° C., hydrogen content 0.33 wt %

D-4: Dimethyl, Methylhydrogen Siloxane, Trimethylsiloxy-terminated as cross-linker, with a viscosity of 5 mPa·s at 25° C., hydrogen content 0.36 wt %

D-5: Carbon black pigment

D-6: Inhibitor Tetramethyltetravinylcyclotetrasiloxane

TABLE 1

| | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|
| A-1 | 100 | 100 | 100 | 100 | 100 | 100 | 100 | 100 | 100 | 100 |
| B-1 | 340 | 340 | 340 | 340 | 340 | 340 | 340 | 340 | 340 | 340 |
| B-2 | 680 | 680 | 680 | 680 | 680 | 680 | 680 | 680 | 680 | 680 |
| C-1 | 10 | | | | | | | | | |
| C-2 | | 10 | | | | | | | | |
| C-3 | | | 10 | | | | | | | |
| C-4 | | | | 10 | | | | | | |
| C-5 | | | | | 10 | | | | | |
| C-6 | | | | | | 10 | | | | |
| C-7 | | | | | | | 10 | | | |
| C-8 | | | | | | | | 10 | | |
| C-9 | | | | | | | | | 10 | |
| C-10 | | | | | | | | | | 10 |

TABLE 1-continued

|  | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|
| Fresh viscosity, cP | 13100 | 9900 | 10400 | 11840 | 9600 | 10600 | 12000 | 10800 | 15600 | 12100 |
| Viscosity after 4 weeks, cP | 10900 | 11700 | 17400 | 10816 | 11200 | 9400 | 11200 | 13800 | 16400 | 16000 |
| Viscosity after 8 weeks, cP | 12300 | 9700 | NA | 12160 | 12100 | 9200 | 10200 | 11100 | 22100 | 17100 |

As shown in Table 1, the compositions containing the invented filler surface treating agents give a better stability than the mono-Si(OMe)$_3$ oligomeric treating agents for keeping a low viscosity with a high conductive filler loading.

TABLE 2

|  | Example 9 | Example 10 | Example 11 | Comparative example 3 | Comparative example 4 |
|---|---|---|---|---|---|
| A-1 | 70 | 70 | 70 | 70 | 70 |
| A-2 | 30 | 30 | 30 | 30 | 30 |
| B-1 | 370 | 370 | 370 | 370 | 370 |
| B-2 | 750 | 750 | 750 | 750 | 750 |
| C-2 | 15 |  |  |  |  |
| C-6 |  | 15 |  |  |  |
| C-7 |  |  | 15 |  |  |
| C-9 |  |  |  | 15 |  |
| C-10 |  |  |  |  | 15 |
| D-1 | 2 | 2 | 2 | 2 | 2 |
| D-2 | 3 | 3 | 3 | 3 | 3 |
| D-3 | 12 | 12 | 12 | 12 | 12 |
| D-4 | 8 | 8 | 8 | 8 | 8 |
| D-5 | 0.65 | 0.65 | 0.65 | 0.65 | 0.65 |
| D-6 | 0.5 | 0.5 | 0.5 | 0.5 | 0.5 |
| Hardness, shore A | 73 | 29 | 36 | 77 | 26 |
| Thermal conductivity, W/m · K | 2.6 | 2.6 | 2.6 | 2.6 | 2.6 |

As shown in Table 2, the compositions containing the invented filler surface treating agents with vinyl end groups give a harder modulus than alkyl end groups.

Example 12

TABLE 3

|  | Example 12 |
|---|---|
| A-1 | 70 |
| A-2 | 30 |
| B-1 | 500 |
| B-2 | 750 |
| C-2 | 30 |
| D-1 | 2 |
| D-2 | 25 |
| D-4 | 5 |
| D-5 | 0.7 |
| D-6 | 0.4 |
| Viscosity, cP | 11200 |
| Hardness, shore A | 75 |
| Thermal conductivity, W/m · K | 2.4 |
| Tensile strength, psi | 450 |
| Elongation, % | 30 |

TABLE 3-continued

|  | Example 12 |
|---|---|
| Lap shear to aluminum, psi | 120 |
| Horizontal flowability, mm | 80 |

As shown in Table 3, the compositions with invented filler surface treating agents exhibit low viscosity/high fluidity, a good level of tensile properties and adhesion even if loaded with a large quantity of conductive filler.

TABLE 4

|  | Example 13 | Example 14 | Example 15 |
|---|---|---|---|
| A-1 | 100 | 100 | 100 |
| B-1 | 330 | 330 | 330 |
| B-2 | 650 | 650 | 650 |
| C-11 | 5 |  |  |
| C-12 |  | 5 |  |
| C-13 |  |  | 5 |
| D-1 | 2 | 2 | 2 |
| Fresh viscosity, cP | 11100 | 11260 | 14340 |
| Viscosity after 3 weeks, cP | 10940 | 12420 | 16440 |

As shown in Table 4, the compositions containing the invented filler surface treating agents with varied mole ratio of formula (I) and (II) are effective to keep a low viscosity with a high conductive filler loading.

What is claimed is:

1. A composition comprising:
   (A) an organopolysiloxane,
   (B) a filler and
   (C) a filler treatment agent, comprising a mixture of two organopolysiloxanes having the general formulas (I) and (II)

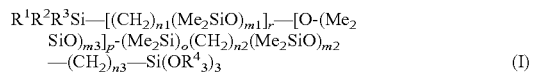

$$R^1R^2R^3Si\text{—}[(CH_2)_{n1}(Me_2SiO)_{m1}]_r\text{—}[O\text{-}(Me_2SiO)_{m3}]_p\text{-}(Me_2Si)_o(CH_2)_{n2}(Me_2SiO)_{m2}\text{—}(CH_2)_{n3}\text{—}Si(OR^4{}_3)_3 \quad (I)$$

wherein 'Me' is methyl group, $R_1$, $R_2$ and $R_3$ are independently selected from an alkyl group having 1 to 20 carbon atoms, an alkenyl group having 2 to 4 carbon atoms, an alkoxy group having 1 to 3 carbon atoms or —(OSiR$^7$R$^8$R$^9$), in which R$_7$, R$^8$ and R$^9$ are independently selected from an alkyl group having 1 to 4 carbon atoms, R$^4$ is an alkyl group having 1 to 4 carbon atoms, n1, n2, m1, m3 and o are integers from 1 to 200, m2, n3, r and p are integers from 0 to 200, r and p are not 0 at the same time, $(R^5O)_3Si-[(CH_2)_{n1}(Me_2SiO)_{m1}]_r-(CH_2)_{n4}-[O-(Me_2SiO)_{m3}]_p-(Me_2Si)o-(CH_2)_{n2}-(Me_2SiO)_{m2}-(CH_2)_{n3}-Si(OR^6)_3$ (II)

wherein $R^5$ and $R^6$ are an alkyl group having 1 to 4 carbon atoms, n1, m1, m3, o and n2 are integers from 1 to 200, n3, n4, m2, r and p are integers from 0 to 200, r and p are not 0 at the same time; and wherein the molar ratio of the organopolysiloxane represented by formula (I) over the organopolysiloxane represented by formula (II) ((I)/(II)) is from 2 to 15.

2. The composition of claim 1, wherein $R^1$ of the formula (I) is an alkyl group having 4 to 20 carbon atoms and $R^2$ and $R^3$ are each alkyl group having 1 to 4 carbon atoms.

3. The composition of claim 1, wherein the amount of the filler is from 50 to 95 weight % based on the weight of the composition.

4. The composition of claim 1, wherein the filler is a thermally conductive filler.

5. A cured silicone material comprising a filler, in which the cured silicone material is formed from the composition of claim 1.

6. The cured silicone material of claim 5, wherein the filler is a thermally conductive filler.

7. The cured silicone material of claim 6, wherein the thermal conductivity of the material is 1.5 W/m·K or more.

8. The cured silicone material of claim 5, wherein the material is selected from rubber, gel, grease, slurry, paste and pottant.

9. A filler treatment agent used for a silicone material, in which the filler treatment agent comprises a mixture of two organopolysiloxanes having the general formulas (I) and (II), $R^1R^2R^3Si-[(CH_2)_{n1}(Me_2SiO)_{m1}]_r-[O-(Me_2SiO)_{m3}]_p-(Me_2Si)_o(CH_2)_{n2}(Me_2SiO)_{m2}-(CH_2)_{n3}-Si(OR^4_3)_3$ (I)

wherein 'Me' is methyl group, $R_1$, $R^2$ and $R^3$ are independently selected from an alkyl group having 1 to 20 carbon atoms, an alkenyl group having 2 to 4 carbon atoms, an alkoxy group having 1 to 3 carbon atoms or $-(OSiR^7R^8R^9)$, in which $R_7$, $R^8$ and $R^9$ are independently selected from an alkyl group having 1 to 4 carbon atoms, $R^4$ is an alkyl group having 1 to 4 carbon atoms, n1, n2, m1, m3 and o are integers from 1 to 200, m2, n3, r and p are integers from 0 to 200, r and p are not 0 at the same time, $(R^5O)_3Si-[(CH_2)_{n1}(Me_2SiO)_{m1}]_r-(CH_2)_{n4}-[O-(Me_2SiO)_{m3}]_p-(Me_2Si)o-(CH_2)_{n2}-(Me_2SiO)_{m2}-(CH_2)_{n3}-Si(OR^6)_3$ (II)

wherein $R^5$ and $R^6$ are an alkyl group having 1 to 4 carbon atoms, n1, m1, m3, o and n2 are integers from 1 to 200, n3, n4, m2, r and p are integers from 0 to 200, r and p are not 0 at the same time and the molar ratio of the organopolysiloxane represented by formula (I) over the organopolysiloxane represented by formula (II) ((I)/(II)) is from 2 to 15.

* * * * *